United States Patent Office 3,785,999
Patented Jan. 15, 1974

3,785,999
PROCESS OF MAKING GRAPHITE-METAL CHLORIDE INTERCALATION COMPOUNDS AND PRODUCT OBTAINED THEREBY
Helmut Derleth, Sarstedt, and Hermann Fischer, Evern, Germany, assignors to Kali-Chemie Aktiengesellschaft, Hannover, Germany
No Drawing. Filed Aug. 13, 1971, Ser. No. 171,765
Claims priority, application Germany, Aug. 19, 1970, P 20 41 167.0
Int. Cl. B01j *11/78*
U.S. Cl. 252—441                                6 Claims

ABSTRACT OF THE DISCLOSURE

Graphite-metal chloride intercalation compounds are made by contacting a mixture of graphite and at least one water of hydration containing metal chloride with a stream of chlorine at a temperature between 200° C. and the decomposition temperature of the intercalation compound and at a pressure between atmospheric and 5 atm.

BACKGROUND OF THE INVENTION

Graphite-metal chloride intercalation compounds have previously been made by heating a mixture of graphite and an anhydrous metal chloride in a chlorine atmosphere to a temperature of several hundred degrees centigrade. The optimum temperature for the intercalation compound depends on the particular metal chloride employed (Angew. Chemie [1963] 75, pp. 130 to 136). It is possible in this manner to intercalate quite different metal chlorides in graphite, such as particularly heavy metal chlorides and earth metal chlorides. The graphite-iron (III)-chloride and even more so the graphite-copper(II)-chloride intercalation compounds are of particular importance as catalysts.

Graphite-iron(III)-chloride intercalation compounds may for instance be made by heating graphite with anhydrous iron(III)-chloride at temperatures between about 200 and 300° C. In this manner, up to 72% by weight of $FeCl_3$ can be incorporated in the product.

Graphite-copper(II)-chloride intercalation compounds can be obtained by heating for eight days a mixture of graphite and anhydrous copper(II)-chloride in a chlorine atmosphere to a temperature of 400° C. Thus, up to a maximum amount of 69.6 wt.-percent can be incorporated in the mixture of copper(II)-chloride. This process, however, has the disadvantage that anhydrous metal chlorides must be used as starting material and that, when introducing the metal chlorides into the reaction chamber, the access of the humidity of air must be avoided under all circumstances. Besides, frequently long reaction times are necessary.

It has also been proposed to make graphite-copper(II)-chloride intercalation compounds by treating a mixture of graphite and pulverulent, non-hygroscopic copper(I)-chloride in a chlorine current at about 350° C., followed by removal of the excess (non-incorporated) copper chloride in a subsequent purification zone by heating the reaction product to temperatures above the chlorination temperature (German Pat. 1,223,350). Other graphite-metal chloride intercalation compounds were obtained, according to the process of this invention, by treating mixtures of graphite powder and metal powder in a chlorine current at temperatures above about 200° C., and then removing contaminations which are not desired in the intercalation type of compounds in a purification zone at a somewhat higher temperature. However, in this process, pure products are again obtained only if the operation is carried out upon complete exclusion of air and humidity.

It was therefore surprising to find that when using metal chlorides containing water of hydration the incorporation of the metal chlorides in the structure could be obtained at a somewhat higher chlorine pressure more rapidly than with the use of anhydrous starting materials.

SUMMARY OF THE INVENTION

The invention accordingly resides in a process of making graphite-metal chloride intercalation compounds by contacting a mixture of graphite powder and at least one water of hydration containing metal chloride with a stream of chlorine at a temperature between 200° C. and the decomposition temperature of the intercalation compound and at a pressure between atmospheric and 5 atm.

The invention also embraces the product obtained by this process.

DESCRIPTION OF THE PREFERRED EMBODIMENTS

As has already been mentioned, the present process discards the old concept that in order to form graphite-metal chloride intercalation compounds humidity must be excluded from the operation, since the compounds were supposed to be attacked by the presence of water.

Various types of water of hydration containing chlorides can be used in the present process, particularly chlorides of heavy metals and earth metals such as $FeCl_3$, $CuCl_2$ and $AlCl_3$. Preferred are the hydrates of $FeCl_3$ and $CuCl_2$. Instead of using only one metal chloride, it is possible also to use mixtures of metal chloride hydrates. The amount of water of hydration containing metal chloride which is intermixed with the graphite powder depends on the desired metal chloride concentration in the final graphite-metal chloride intercalation compound.

While the incorporation of the metal chloride in general takes place by the process of the invention more speedily than when starting with anhydrous compounds, it was furthermore found that the process can be still further expedited by using instead of chlorine alone a chlorine stream which has been saturated with a chlorinated low hydrocarbon compound. Preferred is the use of a chlorine stream to which chloroethane, particularly 1,2-dichloroethane (ethylene chloride), has been added, but also chlorinated $C_1$ to $C_4$ hydrocarbons are useful.

It has furthermore been found that the formation of the graphite-metal chloride intercalation compounds can be improved also by employing a precompressed mixture of pulverulent graphite and pulverulent metal chloride. This implies a formed body which is made at an elevated pressure by treatment in a chlorine stream with or without addition of a chlorinated lower alkane. The pressure employed to compact or condense the powder mixture is not critical. Usually, pressures may be employed up to about 100 or 150 atm. The formed body will disintegrate to a large extent to a powder during the subsequent treatment with the chlorine current.

The preferred temperatures for the reaction are for instance 500° C. in case of $CuCl_2$ and 300° C. in case of $FeCl_3$.

The graphite-metal chloride intercalation compounds made by the process of the present invention have a better resistance against solvents or water than the intercalation compounds made by prior-art processes. This is particularly noticeable in case of the graphite-copper(II)-chloride intercalation compounds. If suitable conditions are observed, it is possible to obtain with the process of the invention after a brief time an intercalation compound in which, for instance, the $CuCl_2$ is less subject to dissolving out by treatment than in case of conventional intercalation compounds.

The compounds of the invention, and in particular the graphite-copper(II)-chloride intercalation compound, are useful particularly as catalysts in connection with the so-called Deacon process. Valuable catalysts can be made by pouring graphite-copper-chloride compounds containing the chloride in amounts between 10 and 69.6 wt. percent.

The following examples will further illustrate the invention.

EXAMPLE 1

60 parts by weight of flake graphite were intimately mixed with 50 wt. parts of $CuCl_2 \cdot 2H_2O$ and the mixture was subjected to compression in a piston press at 100 atm. The compressed mixture was then heated to 500° C. in a reaction vessel for a period of 24 hours in the presence of a weak chlorine current which was saturated with 1,2-dichloroethane. During the reaction a chlorine pressure of 0.15 atm. was maintained.

The compressed shaped body disintegrated more or less during the treatment to a loose powder. The graphite-$CuCl_2$ intercalation compound had a content of about 40 wt. percent of $CuCl_2$.

The following test was carried out to determine the stability of intercalation compound. An aqueous suspension of the intercalation compound was prepared and subjected to boiling for 30 minutes. There was then determined the amount of $CuCl_2$ found in the aqueous extract. It was found that the aqueous extract contained about 10% by weight of the $CuCl_2$ present in the intercalation compound.

For purposes of a comparison test, a graphite-$CuCl_2$ intercalation compound containing 40 wt. percent of $CuCl_2$ was formed by heating a mixture of flake graphite and anhydrous $CuCl_2$ for a period of eight days at 400° C., the heat treatment being carried out in the presence of a weak chlorine current. The thus-obtained aqueous extract contained about 23 wt. percent of the $CuCl_2$ present in the intercalation compound.

EXAMPLE 2

60 parts by weight of a flake graphite were intimately mixed with 65 wt. parts of $FeCl_3 \cdot 6H_2O$ and the mixture was subject to compression in a piston press at 100 atm. The compressed mixture was heated for 24 hours to 300° C., in the presence of a weak chlorine current saturated with 1,2-dichloroethane. During the operation a chlorine pressure of 0.15 atm. was maintained. The compressed body largely disintegrated to a loose powder during the operation. The graphite-$FeCl_3$ intercalation compound thus obtained had a content of about 24 wt. percent $FeCl_3$.

As appears from the examples, the optimum temperature for making the graphite-metal chloride intercalation compound depends on the particular metal chloride employed. However, following the teachings of the invention, it is a routine matter to ascertain the best temperature conditions within the general range given.

What is claimed as new and desired to be secured by Letters Patent is set forth in the appended claims:

1. A process for the production of an intercalation compound of graphite and one or more metal chlorides which comprises intimately mixing together graphite particles with particles of a metal chloride or mixture of two or more metal chlorides containing water of crystallization of the group consisting of cupric chloride dihydrate, ferric chloride hexahydrate, and aluminum chloride hexahydrate, compressing the resulting mixture into a formed body and thereafter passing a stream of chlorine saturated with a chloroalkane having between 1 and 4 carbon atoms at a pressure between atmospheric and 5 atmospheres into contact with the compressed formed body while it is maintained at a temperature between 200° C. and the decomposition temperature of the intercalation compound.

2. A process as defined in claim 1 in which the chloroalkane is a chloroethane.

3. A process as defined in claim 1 in which the chloroalkane is 1,2-dichloroethane.

4. A process as defined in claim 1 in which the metal chloride containing water of crystallization is cupric chloride dihydrate and the chlorine saturated with the chloroalkane is passed into contact with the compressed formed body for a period of 24 hours while the mixture is maintained at a temperature of 500° C.

5. A process as defined in claim 1 in which the metal chloride containing water of crystallization is ferric chloride hexahydrate and the chlorine saturated with the chloroalkane is passed into contact with the compressed formed body for a period of 24 hours while the temperature is maintained at 300° C.

6. A graphite-metal chloride intercalation compound made by the process of claim 1.

References Cited

UNITED STATES PATENTS

| 2,919,266 | 12/1959 | Laver | 252—441 X |
| 3,184,515 | 5/1965 | Penner et al. | 260—659 A |
| 3,240,827 | 3/1966 | Laine et al. | 252—441 X |
| 3,461,084 | 8/1969 | Li | 252—441 |

FOREIGN PATENTS

| 1,223,350 | 8/1966 | Germany | 252—441 |
| 1,533,567 | 6/1968 | France | 252—441 |

PATRICK P. GARVIN, Primary Examiner

U.S. Cl. X.R.

252—442, 447; 260—659 A